March 24, 1964 D. A. AHEARN 3,125,915
DEVICE FOR CUTTING ELECTRIC CABLE COVERINGS
Filed Dec. 28, 1960 2 Sheets-Sheet 1
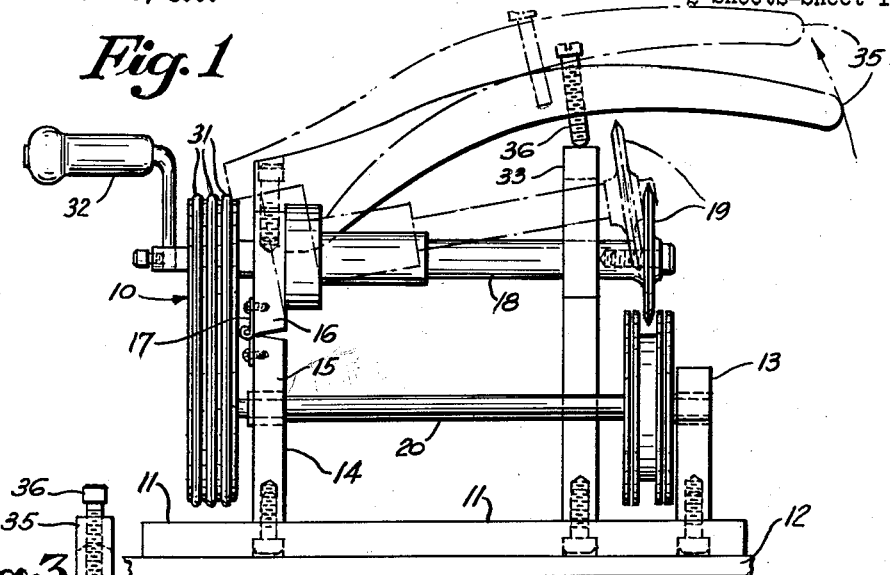
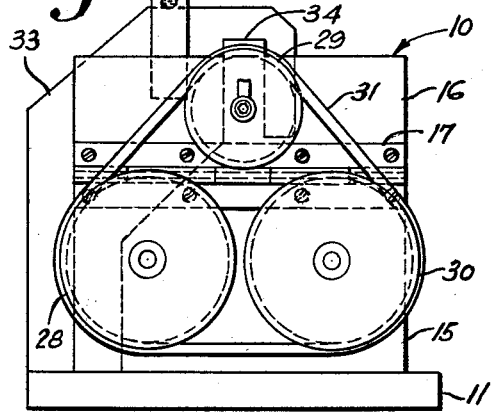
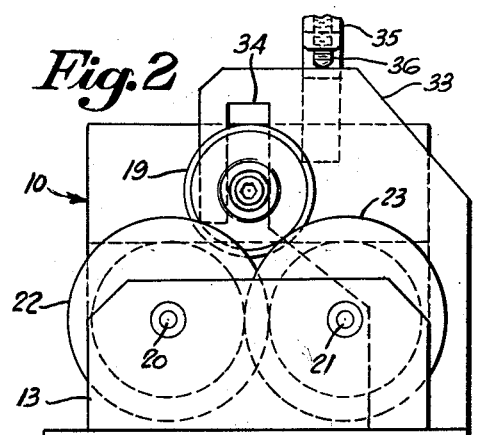
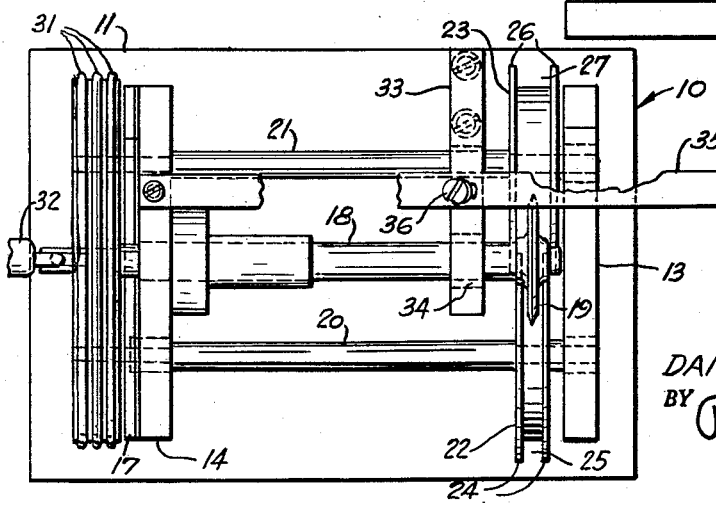
INVENTOR.
DANIEL A. AHEARN
BY Richards & Geier
ATTORNEYS March 24, 1964     D. A. AHEARN     3,125,915
DEVICE FOR CUTTING ELECTRIC CABLE COVERINGS
Filed Dec. 28, 1960     2 Sheets-Sheet 2
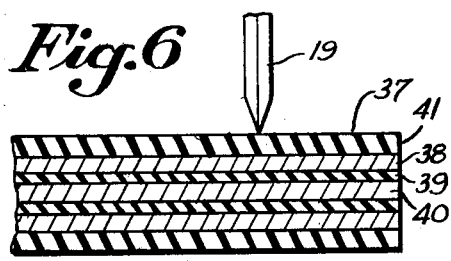
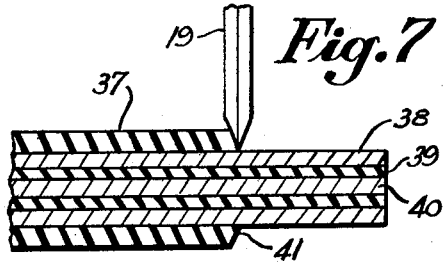
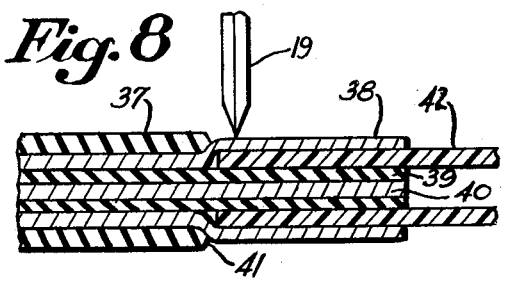
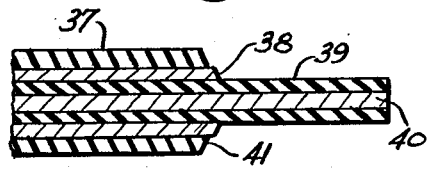
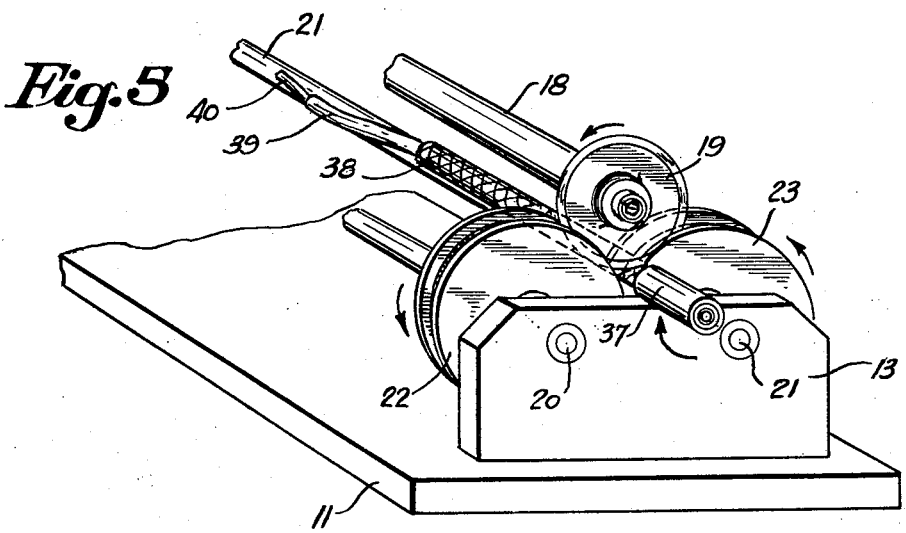
INVENTOR.
DANIEL A. AHEARN
BY
Richards & Geier
ATTORNEYS

United States Patent Office 3,125,915
Patented Mar. 24, 1964

3,125,915
DEVICE FOR CUTTING ELECTRIC CABLE COVERINGS
Daniel A. Ahearn, 26 W. 30th St., Bayonne, N.J.
Filed Dec. 28, 1960, Ser. No. 87,733
1 Claim. (Cl. 82—86)

This invention relates to a cutter device and refers more particularly to a cutter for cutting the sheathing and other coverings of electric cables.

In the present art, various methods of insulating and protecting electric cables are known. One such method provides for enclosing the insulated conductor with a metallic, braided sheathing. The sheathing in turn is covered with a flexible insulative cover of rubber or similar material. When it becomes necessary to expose a portion of the conductor, such as when splicing on an additional length of conductor or repairing a break in the conductor, difficulties are encountered in removing the cable coverings. While cutting through the outer insulative cover is usually of no consequence, since any damage caused by this cutting occurs to the braided sheathing, an improper cutting of the sheathing may result in an additional undesirable cutting of the insulation enclosing the conductor. Since generally, the outer covering and sheathing is removed along the cable for some distance on either side of the point where the conductor will actually be exposed, it frequently happens that these insulation breaks go unnoticed. Thus, these breaks in the conductor insulation cause serious damage such as a short in the conductor or a grounding of the cable circuit. If the insulation breaks are noticed, unnecessary time and effort must be expended to repair them.

It is accordingly a primary object of this invention to provide a cutter device that will cut the outer covering and sheathing of electric cables without damaging the conductor insulation.

It is another object of this invention to provide a cutter device for cutting the outer covering and sheathing of electric cables that is suitable for use with cables of different sizes and composition.

A still further object of this invention is to provide a cutter device for cutting the outer covering and sheathing of electric cables that decreases the time and effort required to perform the cutting.

Another object of this invention is to provide a cutter device for cutting the outer covering and sheathing of electric cables that is compact in size, simple to operate, inexpensive to make and convenient to handle.

Other objects will become apparent in the following specification.

In achieving the aforesaid objects of the present invention, it was found desirable to provide a device in one embodiment of which, a cutter is rigidly mounted on the free end of a shaft. The cutter shaft is rotatably mounted at its other end in the upper half of a two-sectional support block. The upper half of the two-sectional support block is connected by a hinge to a lower half of the block and it in turn is rigidly mounted on a base plate at one of its ends, the base plate being disposed horizontally in normal operation of the cutter device. A second support block is rigidly mounted on the base plate at its other end. Two parallel shafts are rotatably mounted in the second support block and the lower half of the first support block with their axes of rotation lying in the same plane which is a plane parallel to the base plate and also parallel to the axis of rotation of the cutter shaft in its normally operative position. A cable support wheel is rigidly connected to each of these shafts at one end so that in operative position the wheels are below the cutter. The circumferential face of each wheel is marked by a plurality of flanges and a slot, and the flanges on one wheel are so spaced with respect to the flanges on the other wheel that the flanges of the first wheel project into the slot of the second wheel. There is thus formed by the wheel face intersection, a cradle in which the cable to be cut will be supported. Rotation of the wheel faces will also cause a rotation of the cable while it is being cut.

Drive pulleys are mounted on each of the aforesaid shafts and the cutter shaft at the same end. Belts connect the pulleys so that all shafts turn in the same direction. A hand crank may be connected to one of the shafts, preferably the cutter drive shaft, to provide a means for driving all the shafts, although any other suitable method of drive, such as a motor, could be used for this purpose.

A guide bracket is mounted on the base plate intermediate the support blocks and extends upward at a right angle from the base plate. A portion of the bracket extends over and encloses the cutter drive shaft. A slot is formed in the bracket to act as a guide when the cutter drive shaft is raised and lowered in operation of the device.

A handle to move the cutter into operative contact with the cable being cut, is rigidly connected to the top of the upper half of the two-sectional support block and extends along the device to a point past the other support block. An adjustable screw is provided in and extends through the handle and contacts the top of the guide bracket when the handle is lowered. Thus, the cutter can be properly positioned to cut through cable coverings of various thicknesses without damaging the conductor insulation.

The invention will appear more clearly from the following detailed description when taken in connection with the accompanying drawings showing by way of example, a preferred embodiment of the inventive idea.

In the drawings:

FIGURE 1 is a side elevational view of the cutter device constructed in accordance with the principles of this invention the cutter being shown in operative position;

FIGURE 2 is an end elevational view thereof;

FIGURE 3 is an end elevational view of the oppposite end thereof;

FIGURE 4 is a plan view of the device;

FIGURE 5 is a fragmentary perspective view showing the cutter and cable support wheels engaging a section of electric cable in operative position of the device, with some parts removed; and FIGURES 6 to 9 are longitudinal, sectional views of the end of an electric cable showing the sequence of operations involved in cutting the cable coverings with a cutter device constructed in accordance with the principles of the present invention.

Referring now in greater detail to the drawings where like reference numerals indicate like parts, reference numeral 10 indicates the cutter device.

In construction, the cutter device 10 has a substantially flat base plate 11 which may be disposed horizontally on a work bench 12 or the like, in normal operation of the cutter device. An elongated support block 13 is rigidly connected to the base plate 11 at one end and extends upward at a right angle to the base plate. A second elongated support block 14 is mounted on the base plate 11 at its opposite end. The second support block 14 is constituted in two sections having a lower half 15, which is rigidly connected to base plate 11 and extends upward at a right angle thereto, and an upper half 16 which is connected to lower half 15 by means of a piano type hinge 17 so that it is free to rotate about the top of lower half 15. In normal operation of the cutter device 10, the upper half 16 of the support block 14 is disposed co-planar with the lower half 15 of the block. The height of support block 14 is made substantially greater than the height of support block 13.

A cutter shaft 18 is mounted at one end in the upper half 16 of support block 14, and is rotatable therein. In normal operation of the cutter device 10, the axis of rotation of cutter shaft 18 is substantially parallel to base plate 11. A cutter 19 is rigidly connected to cutter shaft 18 at its opposite or free end. A pair of shafts 20, 21 are rotatably mounted, parallel to each other, in support block 13 at one end, and the lower half 15 of support block 14 at the other end. The axis of rotation of each shaft 20, 21 lies in the same plane which is a plane parallel to base plate 11. Further, the axes of rotation of the shafts 20, 21 are spaced equidistant on either side of and parallel to a vertical plane passing through the axis of rotation of cutter shaft 18.

Cable support wheels 22 and 23, which have equal diameters, are rigidly connected to shafts 20 and 21, respectively, at their ends adjacent support block 13, and at a point directly beneath cutter 19. Support wheel 22 has two peripheral flanges 24 and they form a slot 25 in the peripheral face of the wheel 22. Similarly, support wheel 23 has peripheral flanges 26 which form a slot 27 therein. Wheel 22 is made of lesser thickness than wheel 23 so that the flanges 24 of wheel 22 will oppose the slot 27 of wheel 23. The horizontal distance between the axes of rotation of wheels 22 and 23 is less than the diameter of either wheel. Thus, the peripheral faces of wheels 22 and 23 intersect, whereby a cradle is formed to support the electric cable 37 being cut in operation of the cutter device 10, with flanges 24 of wheel 22 rotating in slot 27 of wheel 23. In normal operative position of the cutter 19, it will rotate in the slots 25 and 27 of wheels 22 and 23, respectively.

Drive pulleys 28, 29 and 30 are rigidly connected to shafts 20, 18 and 21, respectively, at their ends where they extend through support block 14. Belting 31 connects the pulleys so that shafts 18, 20 and 21 will rotate together in the same direction.

A hand crank 32 is rigidly connected to one of the shafts, preferably the cutter shaft 18, to provide means for rotating the shafts, although any other suitable driving means, such as an electric motor, could be used for this purpose.

A guide bracket 33 is rigidly connected to the base plate 11 intermediate support blocks 13 and 14 and adjacent support wheel 23. The bracket 33 extends upward at a right angle from the base plate 11 a height in excess of that of support block 14. A portion of the bracket 33 extends over the top of, and encloses, cutter shaft 18. A slot 34 in the bracket acts to guide the cutter shaft 18 when it is raised and lowered in the operation of the cutter device 10.

A handle 35 to move the cutter 19 into operative contact with the electric cable 37 being cut, is rigidly connected to the upper half 16 of support block 14 and extends along the cutter device 10 to a point past the second support block 13. FIGURE 1 illustrates by means of broken lines the position of the cutter 19 and handle 35 in an inoperative position in which position cutter shaft 18 contacts the upper end of slot 34 in guide bracket 33. An adjustable screw 36 is mounted in and extends through handle 35 and in normal operative position of handle 35 contacts the top of guide bracket 33, as illustrated in FIG. 1.

In operation:

The cutter device 10 is located upon a work bench 12 as shown in FIGURE 1. Handle 35 is grasped in one hand by the operator and pulled in an upward direction. This causes upper half 16 of support block 14 to rotate about lower half 15 of the block. Cutter shaft 18 and cutter 19 are thus moved to an inoperative position as illustrated by broken lines in FIGURE 1. The covered end of an electric cable 37 is then placed on the cradle formed by the intersection of support wheels 22 and 23. A downward force is exerted on handle 35, whereby cutter 19 is lowered into contact with the electric cable 37. Adjustable screw 36 has been previously adjusted in handle 35, so that when it contacts the upper edge of guide bracket 33, the cutter 19 will under pressure applied on handle 35 penetrate only the outer covering 41 and braided sheathing 38 of the electric cable 37 during cutting operation. The cable is now firmly supported by the cutter 19 and wheels 22 and 23 as illustrated in FIGURE 5. The operator then rotates the cutter shaft 18 by turning crank 32. This action also results in a rotation of shafts 20 and 21 and hence wheels 22 and 23. The revolving action of wheels 22 and 23 in a certain direction, will cause the electric cable 37 to revolve in the opposite direction. Since cutter 19 is also rotating, a uniform cut will be made at one point around the periphery of the electric cable 37.

FIGURE 6 shows an end of electric cable 37 with the cutter 19 is position preparatory to cutting the outer insulative covering 41. As the cutter 19 and cable 37 revolve the covering 41 is cut through and is then stripped from the cable. This exposes the braided sheathing 38 and renders the cable in a condition as shown in FIGURE 7. The braided sheathing 38 is then cut through and stripped in the same manner leaving the cable in the condition illustrated in FIGURE 9. Thus it is seen that the outer covering 41 and braided sheathing 38 have been cut without damage to the conductor insulation 39 covering the conductor 40.

It has been found convenient though not essential, to employ a plastic or brass tubular insert 42 in cutting through the sheathing 38. The insert 42 is inserted intermediate the sheathing 38 and conductor insulation 39 as illustrated in FIGURE 8, so that if per chance the cutter 19 had not been properly adjusted, damage will not occur to the conductor insulator 39.

It is apparent that the specific illustration shown has been given by way of illustration and not by way of limitation, and that the construction above described is subject to wide variation and modification without departing from the scope of the present invention.

What is claimed is:

A cutter device for cutting the outer protective covering and sheathing on an electric cable and the like, said cutter device comprising an elongated base plate, a support block carried at one end of said base plate and extending upwardly therefrom, said support block having a lower portion rigidly connected to said base plate and an upper portion hingedly connected to said lower portion, another support block rigidly connected to said base plate at the other end and extending upwardly therefrom to a lesser height than the first-mentioned support block, a cutter shaft supported rotatably at one end in the upper portion of the first-mentioned support block, said cutter shaft in an operative position extending in the direction of said other support block and substantially parallel to said base plate, a rotary cutter rigidly connected to said cutter shaft at its other end, a pair of shafts supported rotatably in and extending between the lower portion of the first-mentioned support block and said other support block and under said cutter shaft, said pair of shafts extending parallel to each other and to said base plate, and being symmetrically disposed with respect to said cutter shaft, a wheel firmly connected to each shaft of said pair of shafts at one end, radially directed flanges upon the peripheral face of each wheel, the flanges of each wheel being spaced apart to form a slot therebetween, the flanges of one of said wheels extending into the slot of the other of said wheels, whereby said wheels cooperate to form a cradle for supporting the cable being cut, a guide bracket rigidly connected to said base plate and extending upwardly therefrom, said guide bracket having a slotted portion enclosing said cutter shaft, whereby said cutter shaft is guided when said cutter is moved into contact with said cable, means connected to each of the aforesaid shafts for driving the shafts, and a lever rigidly connected at one end to the upper portion of said first-mentioned support block and extending in the direction of said other support block for swinging said upper portion relatively to the lower portion whereby said cutter may be moved into and out of contact with said cable.

References Cited in the file of this patent

UNITED STATES PATENTS

| | | |
|---|---|---|
| 96,912 | Halliwell | Nov. 16, 1869 |
| 570,850 | Fox | Nov. 3, 1896 |
| 1,042,998 | Blackmore | Oct. 29, 1912 |
| 1,190,192 | Reichel | July 4, 1916 |
| 1,242,448 | Judelshon | Mar. 27, 1934 |
| 2,341,025 | Duncan | Feb. 8, 1944 |
| 2,383,741 | Robinson | Aug. 28, 1945 |

FOREIGN PATENTS

| | | |
|---|---|---|
| 166,426 | Germany | Dec. 22, 1905 |